United States Patent
Wake et al.

(10) Patent No.: US 7,846,596 B2
(45) Date of Patent: Dec. 7, 2010

(54) FUEL CELL SYSTEM AND METHOD OF DISCHARGING A REACTION GAS FROM THE FUEL CELL SYSTEM

(75) Inventors: Chihiro Wake, Shioya-gun (JP);
Tomoki Kobayashi, Utsunomiya (JP);
Yasunori Kotani, Utsunomiya (JP);
Minoru Uoshima, Utsunomiya (JP);
Kenichiro Ueda, Utsunomiya (JP);
Koichiro Miyata, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1230 days.

(21) Appl. No.: 11/267,521

(22) Filed: Nov. 3, 2005

(65) Prior Publication Data

US 2006/0099466 A1    May 11, 2006

(30) Foreign Application Priority Data

Nov. 9, 2004   (JP) .......................... P2004-325120

(51) Int. Cl.
*H01M 8/04* (2006.01)
(52) U.S. Cl. ...................................... 429/428; 429/443
(58) Field of Classification Search ........................ None
See application file for complete search history.

(56) References Cited

U.S. PATENT DOCUMENTS

| | | | | |
|---|---|---|---|---|
| 5,059,494 | A * | 10/1991 | Vartanian et al. | 429/17 |
| 2005/0053814 | A1 * | 3/2005 | Imamura et al. | 429/22 |
| 2005/0074641 | A1 * | 4/2005 | Inai et al. | 429/13 |

FOREIGN PATENT DOCUMENTS

| | | |
|---|---|---|
| JP | 56-114287 | 9/1981 |
| JP | S57-204666 | 12/1982 |
| JP | 63-026962 | 2/1988 |
| JP | 05-205761 | 8/1993 |
| JP | 05-66907 | 10/1993 |
| JP | 09-199149 | 7/1997 |
| JP | 09-293522 | 11/1997 |
| JP | 10-012254 | 1/1998 |
| JP | 11-191422 | 7/1999 |
| JP | 2002-246054 | 8/2002 |
| JP | 2003-331893 | 11/2003 |
| JP | 2004-079490 | 3/2004 |
| JP | 2004-172026 | 6/2004 |

OTHER PUBLICATIONS

Machine translation of JP 09-293522, Nov. 1997.*

* cited by examiner

*Primary Examiner*—Jonathan Crepeau
(74) *Attorney, Agent, or Firm*—Fish & Richardson P.C.

(57) ABSTRACT

A fuel cell system enables time required for purging to be reduced without a major increase in discharge gas concentration at a time of purging. It comprises a fuel cell; a fuel gas supply path for supplying the fuel gas to an anode; an oxidizing gas supply path for supplying an oxidizing gas to a cathode; a fuel gas circulating path for returning an unreacted fuel gas to an anode inlet side; a dilution box for diluting the fuel gas by the oxidizing gas and for discharging it to outside; and a fuel gas discharge path connecting the fuel gas circulating path and a dilution box discharge gas inlet. A drain valve, a purge valve and an air discharge valve are provided, opening areas of which are different from one another. The drain valve with a smallest opening area is initially opened.

4 Claims, 6 Drawing Sheets

FUEL CELL SYSTEM AND METHOD OF DISCHARGING A REACTION GAS FROM THE FUEL CELL SYSTEM

BACKGROUND OF THE INVENTION

1. Field of the Invention

The present invention relates to a fuel cell system which is used in fuel cell-powered vehicles or the like, and more specifically to a fuel cell system which is provided with a means for purging an anode electrode side which is supplied with a fuel gas. Further, the present invention relates to a method of discharging a reaction gas from the fuel cell system.

Priority is claimed on Japanese Patent Application No. 2004-325120, filed Nov. 9, 2004, the content of which is incorporated herein by reference.

2. Description of the Related Art

In such a fuel cell mounted in a fuel cell-powered vehicle or the like, a fuel gas and a oxidizing agent gas are chemically reacted, and at the time of this reaction, energy is obtained and then directly channeled out to external circuits as electrical power. This type of fuel cell has a typical structure which includes an anode electrode and a cathode electrode, which together sandwich a solid polymer electrolyte membrane therebetween, in which a hydrogen gas as a fuel gas is supplied to the anode electrode side on one hand, and on the other hand, air containing oxygen as an oxidizing agent gas is supplied to the cathode electrode side.

Further, there is one type of fuel cell system, which uses such a fuel cell, and in which an unreacted fuel gas, which has passed through the anode electrode, is returned to an inlet side of the anode electrode to thereby promote the efficient use of the fuel gas. This fuel cell system is provided with a fuel gas circulating path, which connects an inlet side and an outlet side of the anode electrode and through which a fuel gas containing a reacted gas is repeatedly circulated, so that water (or moisture) and other impurities are gradually and increasingly deposited in a path (including a circulating path portion) at the outlet side of the anode electrode. Consequently, a mechanism for appropriately purging an internal gas is provided on the path at the outlet side of the anode electrode.

In a fuel cell system of this type, when operation of a fuel cell is stopped, it is necessary to reliably discharge water and the like, which remain in an outlet side of the anode electrode, to outside in order to avoid freezing and clogging in a path at a time of resumption of operation. As a countermeasure, a new type of fuel cell system has been developed, wherein a dilution gas that is different from a fuel gas is introduced in the anode electrode side and wherein water and other impurities in a path are purged by this dilution gas (see, for example, Japanese Unexamined Patent Application, First Publication No. 2003-331893).

This fuel cell system is structured such that a feed path for an oxidizing agent gas is connected to the anode electrode side and that a gas feed valve of open/close type is provided on the feed path and is opened at a time of purging of the anode electrode side. It is also structured such that a plurality of discharge ports are provided at an outlet side of the anode electrode and that these ports are opened at a time of purging to thereby discharge residual gas of the anode electrode side together with a dilution gas (oxidizing agent gas) to outside.

However, in this conventional fuel cell system, since all of the discharge ports are suddenly opened at a time of purging of the anode electrode side, a fuel gas emission concentration of a discharged gas is temporarily and totally raised.

Therefore, in the above-described conventional fuel cell system, provision is made in which power generation is continued within a predetermined period of time while continuing stoppage of the supply of a fuel gas and in which purging is carried out after a fuel gas in a fuel gas circulating path has sufficiently been consumed. As a result, in this conventional fuel cell system, time required for the completion of purging is inevitably elongated. Therefore, at the present time, improvements with respect thereto are earnestly desired.

SUMMARY OF THE INVENTION

In consideration of the above circumstances, according to the present invention, a fuel cell system is provided, wherein the time required for the completion of purging can be reduced without any extensive increase in a fuel gas emission concentration at a time of purging in an anode electrode side.

According to a first aspect of the present invention, a fuel cell system is provided including: a fuel cell which includes an anode electrode and a cathode electrode, and which is adapted to perform power generation by a chemical reaction of a fuel gas which is supplied to the anode electrode and an oxidizing agent gas which is supplied to the cathode electrode; a fuel gas supply path for supplying the fuel gas to the anode electrode; an oxidizing agent gas supply path for supplying the oxidizing agent gas to the cathode electrode; a fuel gas circulating path for returning an unreacted fuel gas, which has passed through the anode electrode, to an inlet side of the anode electrode; a discharge port element for discharging the gas from an outlet side of the anode electrode to outside; fuel gas dilution means for diluting the fuel gas, which has passed through the discharge port element, by the oxidizing agent gas and for discharging it to outside; and anode purging means for introducing a dilution gas, which is different from the fuel gas, to the anode electrode side and for purging residual gases, which remain in the anode electrode and the fuel gas circulating path, through the discharge port element; wherein when purging by the anode purging means, the flow volume of a gas flowing through the discharge port element is controlled so as to be gradually increased.

Preferably, the discharge port element comprises a plurality of discharge ports, and wherein when purging by the anode purging means, the discharge ports are separately opened with time differences thereamong in such a manner that a total of opening areas of the discharge ports is stepwisely increased. Further, preferably, the opening areas of the discharge ports are different from one another, and wherein when purging by the anode purging means, of all the plurality of discharge ports one discharge port whose opening area is the smallest is opened prior to openings of the remaining discharge ports. Still further, preferably, the system further comprises a flow control valve which controls the flow volume of a gas flowing through the discharge port element, and wherein when purging by the anode purging means, the flow control valve is controlled in such a manner that the flow volume of a gas flowing through the discharge port element is gradually increased. Yet further, preferably, the anode purging means comprises a feed path and a gas feed valve, the feed path is provided in a branching manner on the oxidizing agent gas supply path for introducing the oxidizing agent gas to the anode electrode side, and the gas feed valve is provided on the feed path and capable of an opening and closing motion.

According to a second aspect of the present invention, a method for discharging a reaction gas from a fuel cell system is provided, in which the system includes an anode electrode and a cathode electrode and is adapted to perform power generation by a chemical reaction of a fuel gas which is supplied to the anode electrode and an oxidizing agent gas which is supplied to the cathode electrode, said method comprising: providing a discharge port element for discharging the gas from an outlet side of the anode electrode to outside; introducing a dilution gas, which is different from the fuel gas, to the anode electrode side; and carrying out purging by controlling the discharge port element such that the flow volume of a gas flowing through the discharge port element is gradually increased.

Preferably, the method further comprises: providing a plurality of discharge ports as the discharge port element; and carrying out purging by controlling the discharge ports such that the discharge ports are separately opened with time differences thereamong in such a manner that a total of opening areas of the discharge ports is stepwisely increased. Further, preferably, the method further comprises: making the opening areas of the discharge ports different from one another; and carrying out purging by controlling the discharge ports such that, of all the plurality of discharge ports, one discharge port whose opening area is the smallest is opened prior to openings of the remaining discharge ports. Still further, preferably, the method further comprises: providing a flow control valve which controls the flow volume of a gas flowing through the discharge port element; and carrying out purging by controlling the flow control valve such that the flow volume of a gas flowing through the discharge port element is gradually increased. Yet further, preferably, the method further comprises: providing a feed path in a branching manner on the oxidizing agent gas supply path so as to introduce the oxidizing agent gas to an anode electrode side; and providing on the feed path a gas feed valve, which is capable of an opening and closing motion.

DETAILED DESCRIPTION OF THE INVENTION

Figure 1:
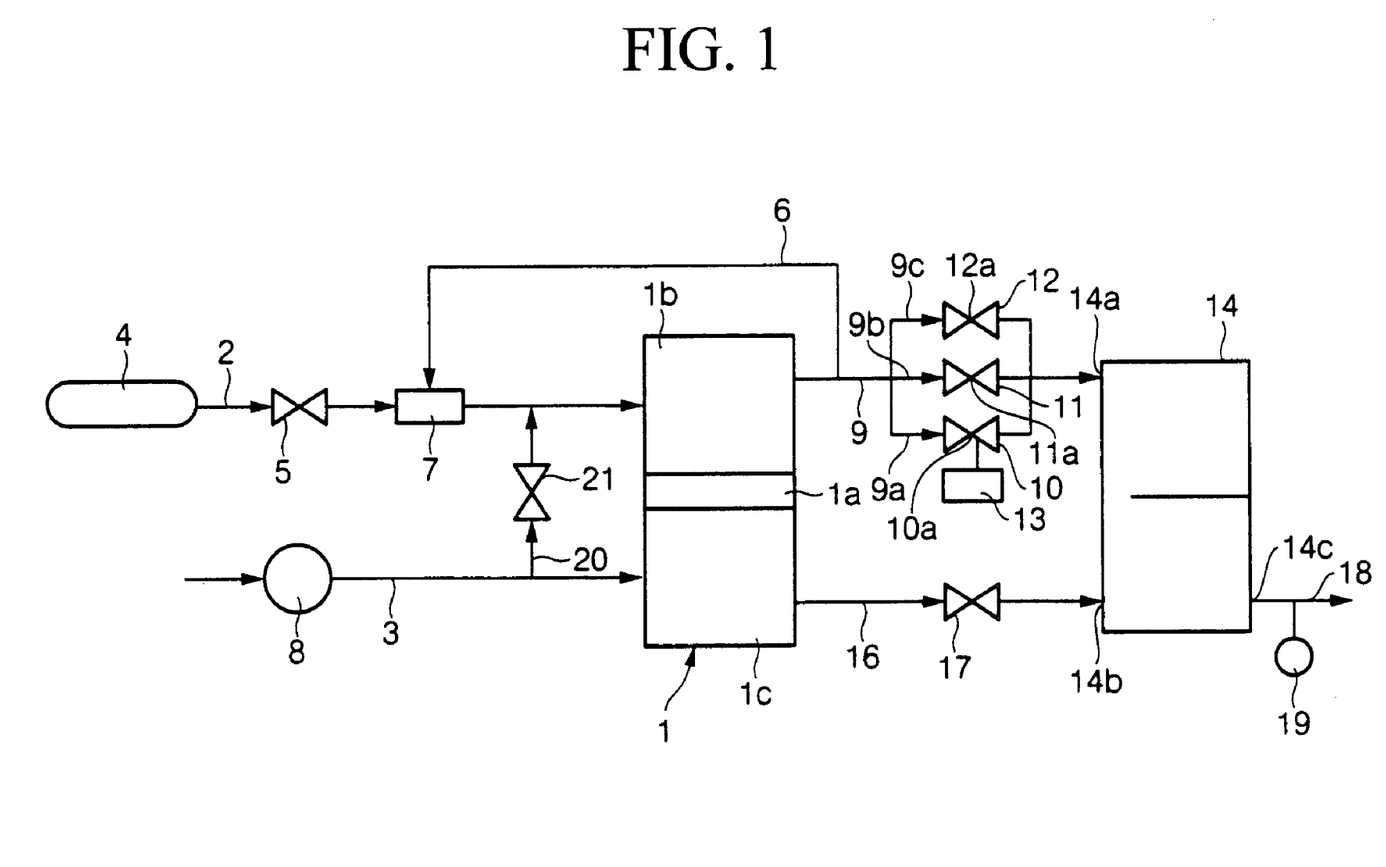
FIG. 1 is a general structural view showing a fuel cell system according to a first embodiment of the present invention.
Figure 2:
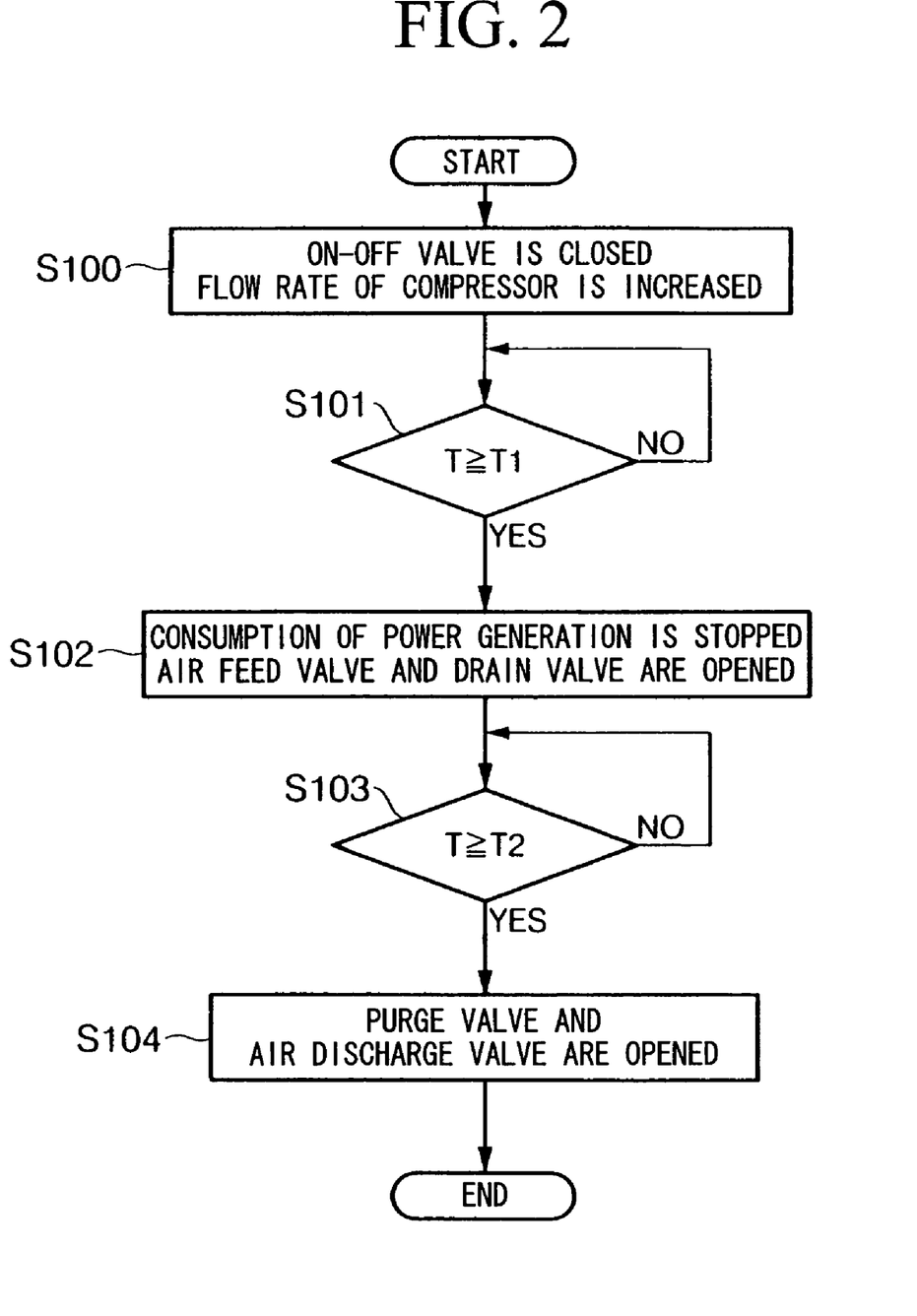
FIG. 2 is a flowchart partly showing the process in the first embodiment.
Figure 3:
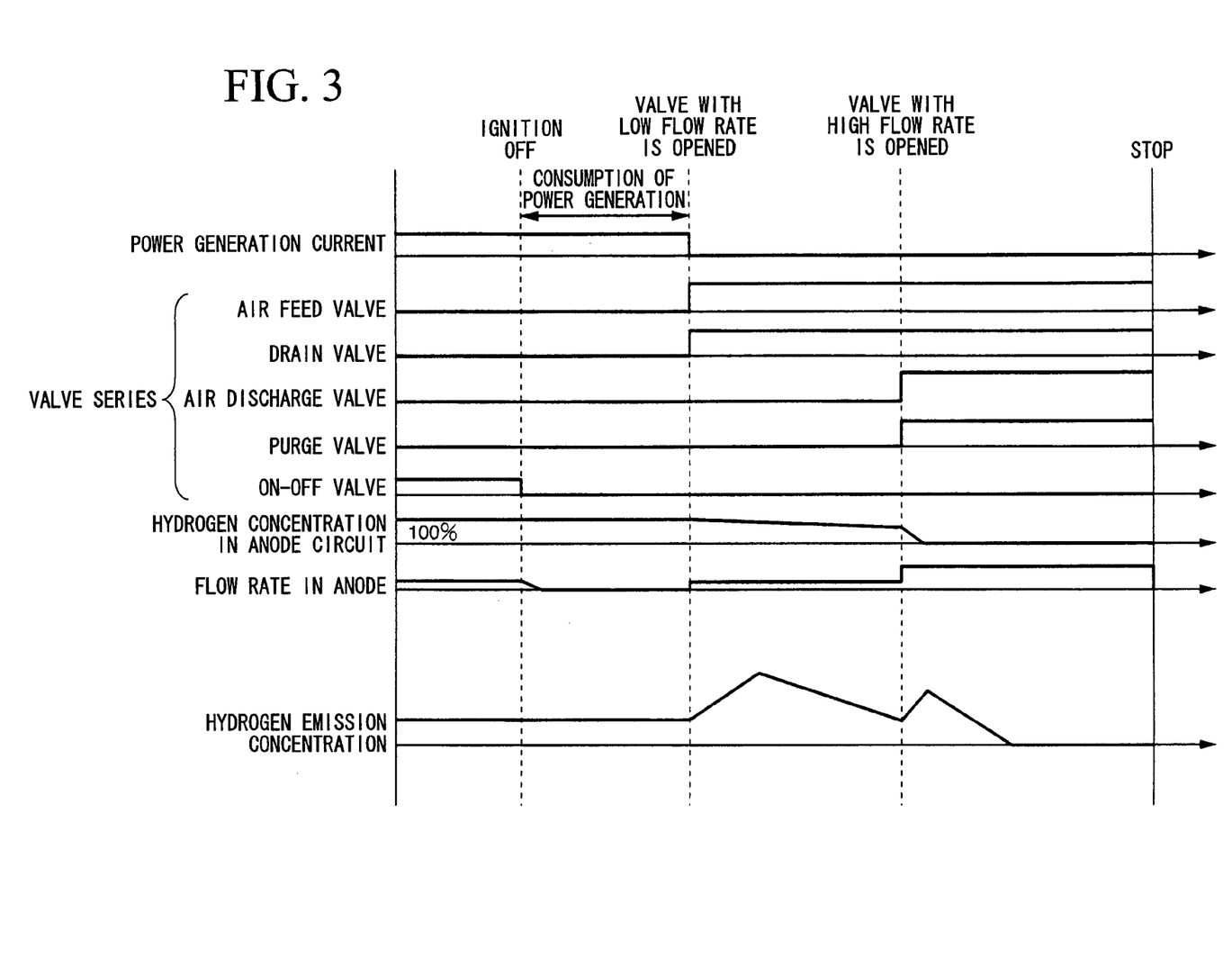
FIG. 3 is a time chart showing a change in a system state including an operating condition of valves used, a power generating condition, and hydrogen gas concentration, of the first embodiment

Referring to FIGS. 1 through 3, a first embodiment of the present invention will be described hereinafter. Note that the following descriptive embodiment is an example of a fuel cell system mounted in a fuel cell-powered vehicle.

FIG. 1 is an overall structural view showing a fuel cell system according to the present invention.

As shown in FIG. 1, a fuel cell 1 includes a stack, which is formed by stacking a plurality of cells, each of which includes a solid polymer electrolyte 1a (e.g., a solid polymer ion-changing membrane, which is referred to as an "electrolyte membrane 1a"), an anode electrode (negative pole) 1b, and a cathode electrode (positive pole) 1c, said anode electrode 1b and cathode electrode 1c sandwiching the electrolyte membrane 1a. For the sake of simplicity, only a single cell is shown in the figure.

In the fuel cell 1, the anode electrode 1b is supplied with hydrogen as a fuel gas, and the cathode electrode 1c is supplied with air containing oxygen as an oxidant gas. When the anode electrode 1b is supplied with hydrogen, hydrogen ions are produced in the anode electrode 1b by a catalytic reaction, which reach the cathode electrode 1c through the electrolyte membrane 1a. In the cathode electrode 1c, the hydrogen ions electrochemically react with oxygen contained in the air, such that electrical power is generated.

Note that, at a time of power generating, water is formed in the cathode electrode 1c side, and that part of the formed water back-diffuses to the anode electrode 1b side through the electrolyte membrane 1a, as a phenomenon.

A fuel gas supply path 2 is connected to the anode electrode 1b of the fuel cell 1 to supply a hydrogen gas as a fuel gas. An oxidizing agent gas supply path 3 is connected to the cathode electrode 1c of the fuel cell 1 to supply air as an oxidizing agent gas.

A hydrogen tank 4, which receives a hydrogen gas, is connected to the upstream side of the fuel gas supply path 2 via an on-off valve 5. The on-off valve 5 is controlled by an unillustrated controller such that the hydrogen gas can be supplied from the hydrogen tank 4 to the anode electrode 1b side in response to an opening motion of the on-off valve 5.

To the anode electrode 1b of the fuel cell 1 is connected a fuel gas circulating path 6, which returns an unreacted hydrogen gas that has passed through the inside of the anode electrode 1b, to an inlet side of the anode electrode 1b. The fuel gas circulating path 6 is connected and merged with the fuel gas supply path 2 through an ejector 7 at the inlet side of the anode electrode 1b, so that the unreacted hydrogen gas is mixed with fresh hydrogen and then resupplied to the anode electrode 1b.

Further, a fuel gas discharge path 9 is provided in a branching manner at a portion of an outlet side of the anode electrode 1b of the fuel gas circulating path 6. On the fuel gas discharge path 9 are provided three branch paths 9a, 9b, and 9c, which have respective valves, i.e., a drain valve 10, a purge valve 11, and an air discharge valve 12.

The drain valve 10 is intended mainly to discharge residual water in the fuel gas circulating path 6 to a catching tank 13. Of the three valves 10, 11, and 12, the drain valve 10 has a smallest opening area.

The purge valve 11 is intended mainly to appropriately discharge water and other impurities which reside in combination in the fuel gas circulating path 6 when the fuel cell system is in operation. Of the three valves 10, 11, and 12, the purge valve 11 has an intermediate opening area.

The air discharge valve 12 is intended to discharge a gas to purge the inside of the fuel gas circulating path 6. Of the three valves 10, 11, and 12, the air discharge valve 12 has a largest opening area.

The three branching paths 9a, 9b, and 9c are merged at the downstream sides of the respective valves 10, 11, and 12, and then connected to a discharge gas inlet 14a of a dilution box 14, which will be described hereinafter, and which corresponds to an oxidizing agent gas dilution means. Note that, in this embodiment, openings 10a, 11a, and 12a of the valves 10, 11, and 12, respectively, through which gases flow, constitute "a discharge port element" or "discharge ports" of the present invention.

In the mean time, a compressor 8 to pressurize and convey a gas is connected to the upstream side of the oxidizing agent gas supply path 3. Further, to the cathode electrode 1c of the fuel cell 1 is connected an oxidizing agent gas discharge path 16, which discharges air that has passed through the cathode electrode 1c. On the oxidizing agent gas discharge path 16 is provided a back-pressure control valve 17, which regulates an internal pressure of the cathode electrode 1c. The downstream side of the oxidizing agent gas discharge path 16 is connected to a diluent gas inlet 14b of the above-described dilution box 14.

As described, the dilution box 14 has the discharge gas inlet 14a connected to the fuel gas discharge path 9, and the diluent gas inlet 14b connected to the oxidizing agent gas discharge path 16. In addition thereto, it has a discharge outlet 14c, which is connected to a dilution gas discharge path 18 that opens outside the system. In the dilution box 14, a hydrogen gas, which enters via the discharge gas inlet 14a from the fuel gas discharge path 9, is mixed with air, which flows from a diluent gas inlet 14b side toward a discharge outlet 14c side. The hydrogen gas diluted thereby is discharged through the dilution gas discharge path 18 to the outside of the system. Note that a hydrogen gas concentration sensor 19 is provided on the dilution gas discharge path 18 at the downstream side of the dilution box 14, and detection signals emitted therefrom are inputted to the unillustrated controller.

On the oxidizing agent gas supply path 3 is provided in a branching manner a feed path 20, which introduces pressurized air (i.e., an oxidizing agent gas) from the compressor 8 to an inlet side of the anode electrode 1b. On the feed path 20 is provided an air feed valve 21, opening and closing of which the controller controls. The air feed valve 21, in a normal position thereof, closes the feed path 20. It opens the feed path 20, at a time of purging of the anode electrode 1b, under control of the controller. Note that, in this embodiment, the feed path 20 and the air feed valve 21 together with the compressor 8 constitute "anode purging means" of the present invention.

Hereinafter, control of the fuel cell system when the fuel cell-powered vehicle is stopped will be described with reference to a flowchart of FIG. 2, while referring to a time chart of FIG. 3. Note that, when an ignition switch of the fuel cell-powered vehicle is turned ON, the air feed valve 21, the drain valve 10, the purge valve 11, and the air discharge valve 12 are normally closed, whereas the on-off valve 5 is open.

When the ignition switch is turned OFF, in step S100, the controller initially closes the on-off valve 5 and increases a flow rate of the compressor 8. Step S101 judges whether or not a time T that elapses after the on-off valve 5 is closed reaches a predetermined time T1. After it reaches the predetermined time T1, the routine proceeds to next step S102. Note that, until it proceeds to step S102, the fuel cell system continues consumption of power generation due to a burden.

In step S102, such consumption of power generation is stopped, and the air feed valve 21 and the drain valve 10 are opened. After the air feed valve 21 is thus opened, pressurized air flows from the compressor 8 through the feed path 20 to the anode electrode 1b and hence to the fuel gas circulating path 6. The air, which has thus flowed in the fuel gas circulating path 6, dilutes residual hydrogen gas in the path 6 and together flows through the drain valve 10 into the dilution box 14. This process is continued until an elapsed time T reaches a predetermined time T2 (step S103). After a time in which it has reached T2, the routine proceeds to next step S104.

In step S102, as mentioned above, when the drain valve 10 is opened, the gas in the fuel gas circulating path 6 flows in the dilution box 14 through the discharge gas inlet 14a. At this time, since hydrogen gas gradually flows in the diluent box 14 through the drain valve 10 due to the small opening area of the drain valve 10, the fuel gas is sufficiently diluted in the dilution box 14 by air which is introduced through the diluent gas inlet 14b. Thus, peak concentration of a discharge gas, which is discharged outside through the dilution gas discharge path 18, is controlled below a predefined value, as shown in FIG. 3.

Then, after a certain time has passed, the routine proceeds to step S104, where the purge valve 11 and the air discharge valve 12 are simultaneously opened by the controller, such that a residual hydrogen gas in the fuel gas circulating path 6 is rendered to flow at once in the dilution box 14. At this time, large quantities of gas from the fuel gas circulating path 6 flow in the dilution box 14. In the fuel gas circulating path 6, dilution to a certain level is already realized by air fed from the compressor 8 in previous steps (i.e., S102, S103). Therefore, in the dilution box 14, satisfactory dilution is realized due to further mixing with a lot of air. As a result, emission concentration of hydrogen, which is discharged from the dilution gas discharge path 18, is also controlled below a predetermined level (see FIG. 3). At the same time, a gas in the fuel gas circulating path 6 is discharged therefrom at once through the purge valve 11 and the air discharge valve 12, and therefore, water and other impurities, which reside in the fuel gas circulating path 6, can be reliably outwardly discharged.

As described above, in the present fuel cell system, it is structured such that, the drain valve whose opening area is smallest (of all related valves) is firstly opened for (at least) a predetermined period, and thereafter, the purge valve 11 and the air discharge valve 12, both of which have lager opening areas, are opened. The problems in which a hydrogen gas, which has a high concentration beyond a level of the diluting ability of the dilution box 14, simultaneously enters the dilution box 14 can be avoided. Further, by changing an opening area of the drain valve 10 and an opening time of the same, hydrogen gas concentration in the fuel gas circulating path 6 and the dilution box 14 can be regulated. It is thus possible to reduce the time required for purging, while maintaining the hydrogen concentration below a predetermined level. It is also possible to reduce the time required for power generation just after the ignition switch (of the fuel cell-powered vehicle) is turned OFF.

Note that, although, in the present embodiment, the oxidizing agent gas supply path 3 has the feed path 20 provided thereon in a branching manner through which air as a purging/scavenging gas is introduced to the anode electrode 1b side, instead, a tank or the like dedicated to purging a gas can be separately provided. Nevertheless, in cases such as the embodiment in which the feed path 20 and the air feed valve 21 are provided and in which the air in the oxidizing agent gas supply path 3 is used as a purging gas, there is no need to separately provide a purge gas supply unit to be used exclusively. As a result, a reduction in size and manufacturing cost reductions of the whole system can be achieved.

Further, in the above-mentioned embodiment, it is structured such that the timing of opening of the purge valve 11 and the air discharge valve 12 after the drain valve 10 is opened is controlled and determined based on an elapsed time (see step S103 of FIG. 2). However, a structure is possible in which the hydrogen gas concentration at a downstream side of the dilution box 14 is controlled based on detection signals emitted from the hydrogen gas concentration sensor 19 and in which the purge valve 11 and the air discharge valve 12 are opened when the hydrogen gas concentration is below a predetermined level.

Figure 4:
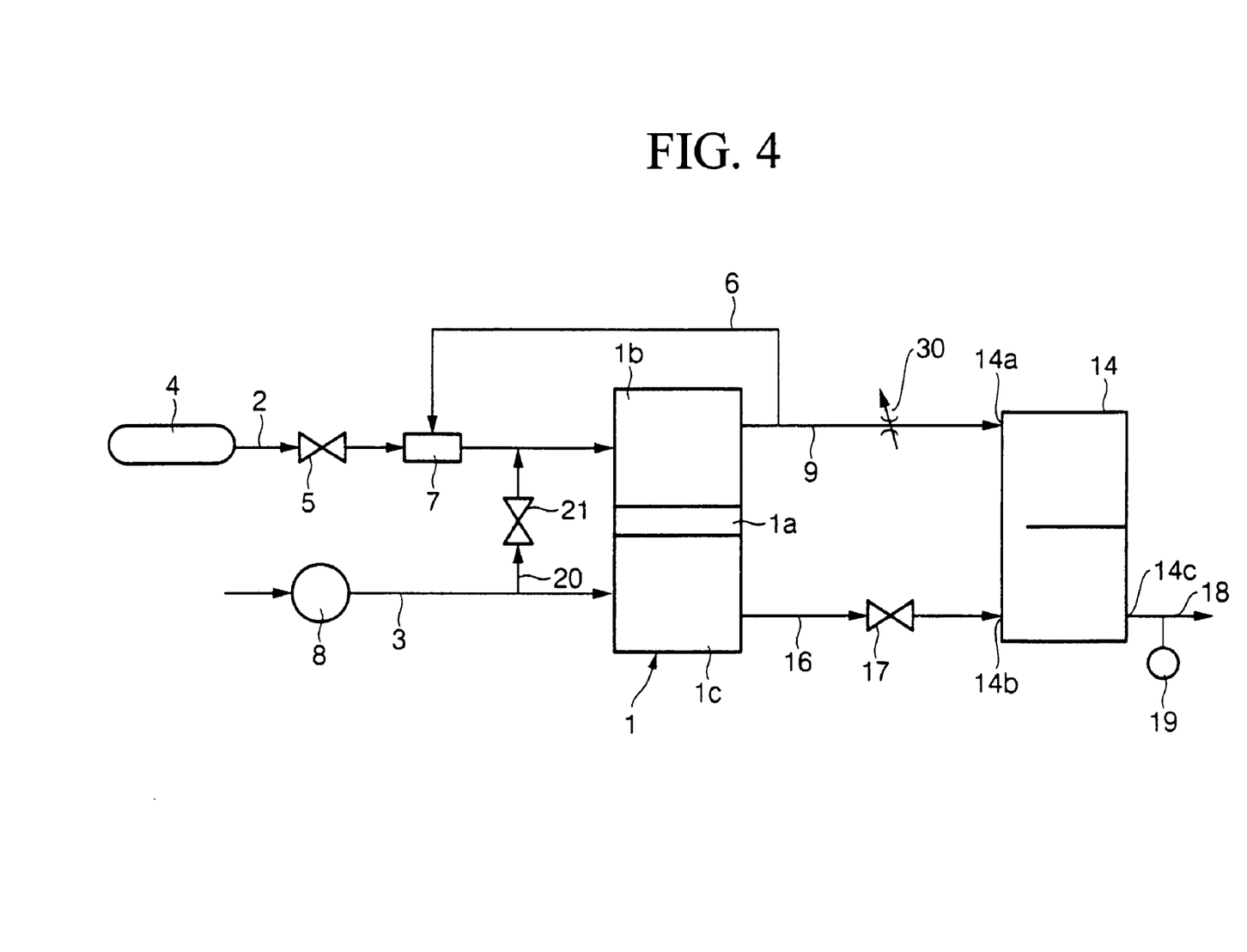
FIG. 4 is a general structural view showing a fuel cell system according to a second embodiment of the present invention.
Figure 5:
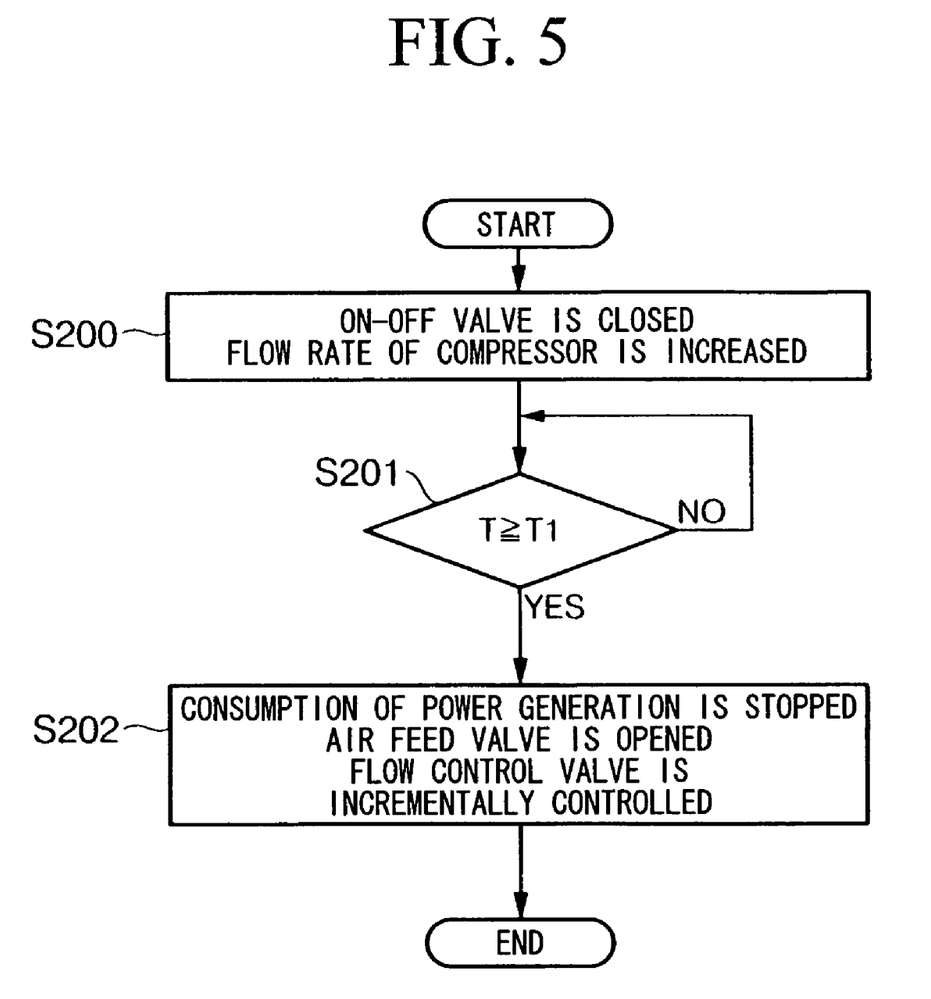
FIG. 5 is a flowchart partly showing the process in the second embodiment.
Figure 6:
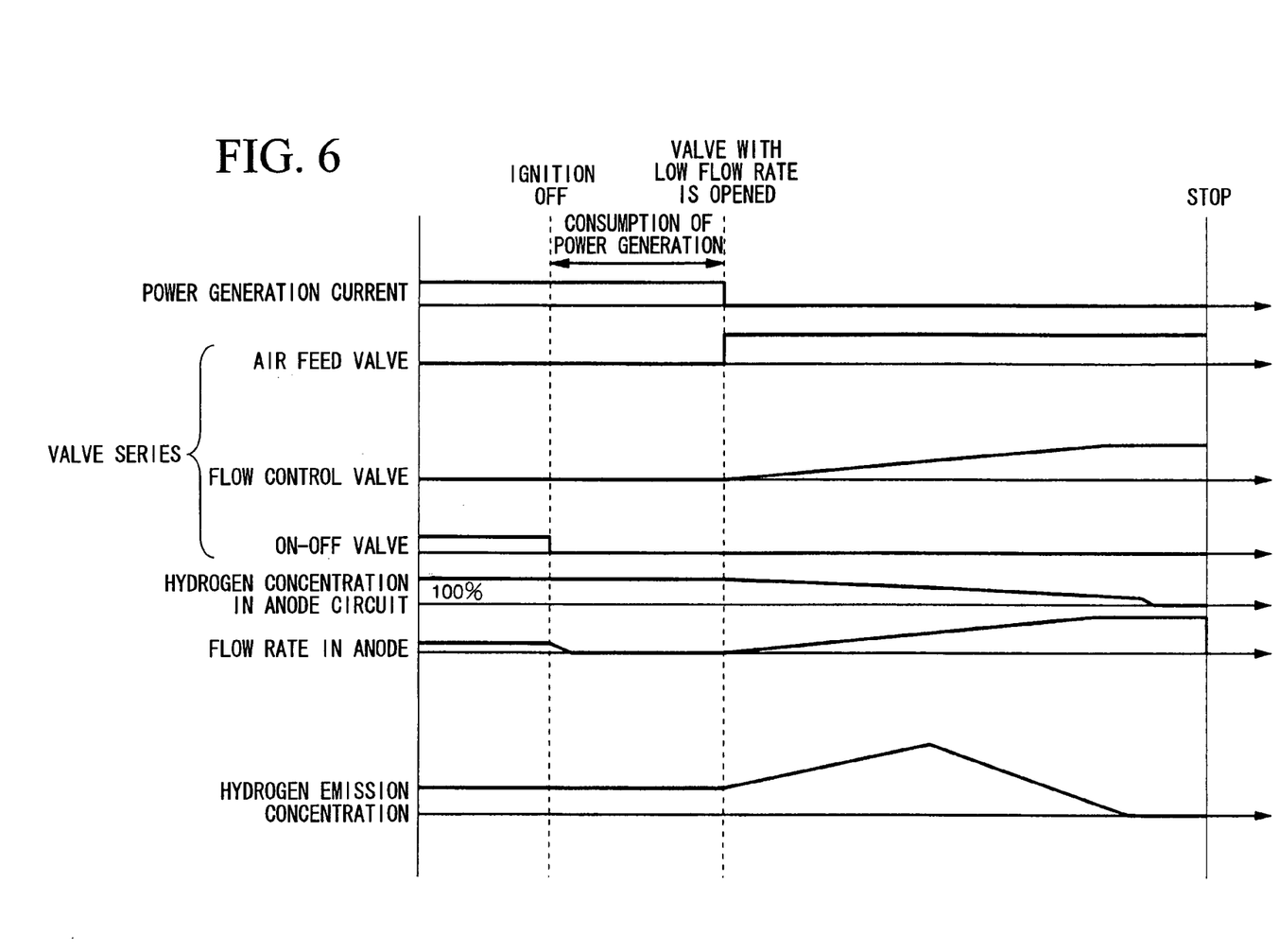
FIG. 6 is a time chart showing a change in a system state including an operating condition of valves used, a power generating condition, and hydrogen gas concentration, of the second embodiment.

Next, a second embodiment depicted in FIGS. 4 through 6 of the present invention will be described. Although a basic structure of a fuel cell system of the second embodiment is almost the same as that of the first embodiment, they are distinctly different in that a flow control valve 30 with continuous (or stepless) opening-area settings is provided on the fuel gas discharge path 9 connecting the anode electrode 1b of the fuel cell 1 and the discharge gas inlet 14a of the dilution box 14. Note that, for convenience of explanation, parts and portions of the second embodiment which are common to the first embodiment or which can be used in common are denoted by the same reference numerals, and a repeated description will be appropriately omitted.

Hereinafter, control of the fuel cell system when the fuel cell-powered vehicle is stopped will be described with reference to a flowchart of FIG. 5 and a time chart of FIG. 6.

When the ignition switch is turned OFF, in step S200, the controller closes the on-off valve 5 and increases a flow rate of the compressor 8. Step S201 judges whether or not a time T that elapses after the on-off valve 5 is closed reaches a predetermined time T1, and after it reaches the predetermined time T1, the routine proceeds to next step S202. Note that the fuel cell system continues consumption of power generation due to a burden.

In step S202, such consumption of power generation comes to a stop, and the air feed valve 21 opens, and further, control of the flow control valve 30 starts in such a manner that the flow volume of the gas flowing through the fuel gas discharge path 9 gradually increases. At an initial or earlier stage of control in which the hydrogen gas concentration in the fuel gas circulating path 6 is high, the volume of a hydrogen gas, which flows in the dilution box 14 from the fuel gas circulating path 6, is low, and therefore, the hydrogen gas in the dilution box 14 is reliably diluted below a predetermined value. Further, as time goes by after control of the flow control valve 30 starts, the hydrogen gas in the fuel gas circulating path 6 is gradually diluted by air. Therefore, even if the volume of a gas, which flows from the fuel gas circulating path 6 into the dilution box 14, gradually increases, it is possible to control a hydrogen gas emission concentration of the gas, which was diluted in the dilution box 14, below a predetermined value.

The present invention is by no means limited to the above-mentioned preferred embodiments. It will be obvious to those skilled in the art that various modifications may be made without departing from the true spirit and scope of the present invention. For example, although the aforementioned embodiments are ones in which a fuel cell system according to the present invention is applied to a fuel cell-powered vehicle, it is possible for the present invention to be applied to an apparatus other than a fuel cell-powered vehicle.

Again, as is appreciated from the foregoing description, while preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell system comprising:
   a fuel cell which includes an anode electrode and a cathode electrode, and which is adapted to perform power generation by a chemical reaction of a fuel gas which is supplied to the anode electrode and an oxidizing agent gas which is supplied to the cathode electrode;
   a fuel gas supply path for supplying the fuel gas to the anode electrode;
   an oxidizing agent gas supply path for supplying the oxidizing agent gas to the cathode electrode;
   a fuel gas circulating path for returning an unreacted fuel gas, which has passed through the anode electrode, to an inlet side of the anode electrode;
   a discharge port element for discharging gas from an outlet side of the anode electrode to outside;
   fuel gas dilution means for diluting the fuel gas, which has passed through the discharge port element, by the oxidizing agent gas and for discharging it to outside; and
   anode purging means for introducing a dilution gas, which is different from the fuel gas, to the anode electrode side and for purging residual gases, which remain in the anode electrode and the fuel gas circulating path, through the discharge port element, wherein the discharge port element includes:
      a drain valve through which a residual water in the fuel gas circulating path is discharged;
      a purge valve through which water and other impurities, which reside in combination in the fuel gas circulating path when the fuel cell system is in operation, are discharged;
      an air discharge valve through which a gas to purge an inside of the fuel gas circulating path is discharged;
      three branch paths which include, respectively, the drain valve, the purge valve, and the air discharge valve, and
      a controller to control opening and closing of the drain valve, the purge valve, and the air discharge valve, respectively, wherein among the drain valve, the purge valve, and the air discharge valve, the drain valve has a smallest opening area, the purge valve has an intermediate opening area, and the air discharge valve has a largest opening area, and
   wherein the fuel cell system is arranged such that, when purging by the anode purging means, the flow volume of a gas flowing through the three branch paths is controlled by the controller so as to be gradually increased, and at the same time, dilution by the fuel gas dilution means is controlled by the controller so as to increase the flow volume of the gas flowing from the three branch paths to the fuel gas dilution means in accordance with reduction by the dilution gas in a hydrogen concentration of the residual gases remaining in the anode electrode, and thereby always regulating the hydrogen concentration of the fuel gas discharged from the fuel gas dilution means to a value below a predefined value.

2. The fuel cell system according to claim 1, wherein the fuel cell system is arranged such that, when purging by the anode purging means, the drain valve, the purge valve, and the air discharge valve are separately opened by the controller with time differences thereamong in such a manner that a total of the opening areas of the purge valve, the air discharge valve, and the air discharge valve is stepwisely increased.

3. The fuel cell system according to claim 2 arranged such that the drain valve is opened prior to opening the purge valve and the air discharge valve.

4. The fuel cell system according to claim 1, wherein said anode purging means comprises a feed path and a gas feed valve, the feed path is provided in a branching manner on the oxidizing agent gas supply path for introducing the oxidizing agent gas to an anode electrode side, and the gas feed valve is provided on the feed path and capable of opening and closing motion.

* * * * *